UNITED STATES PATENT OFFICE.

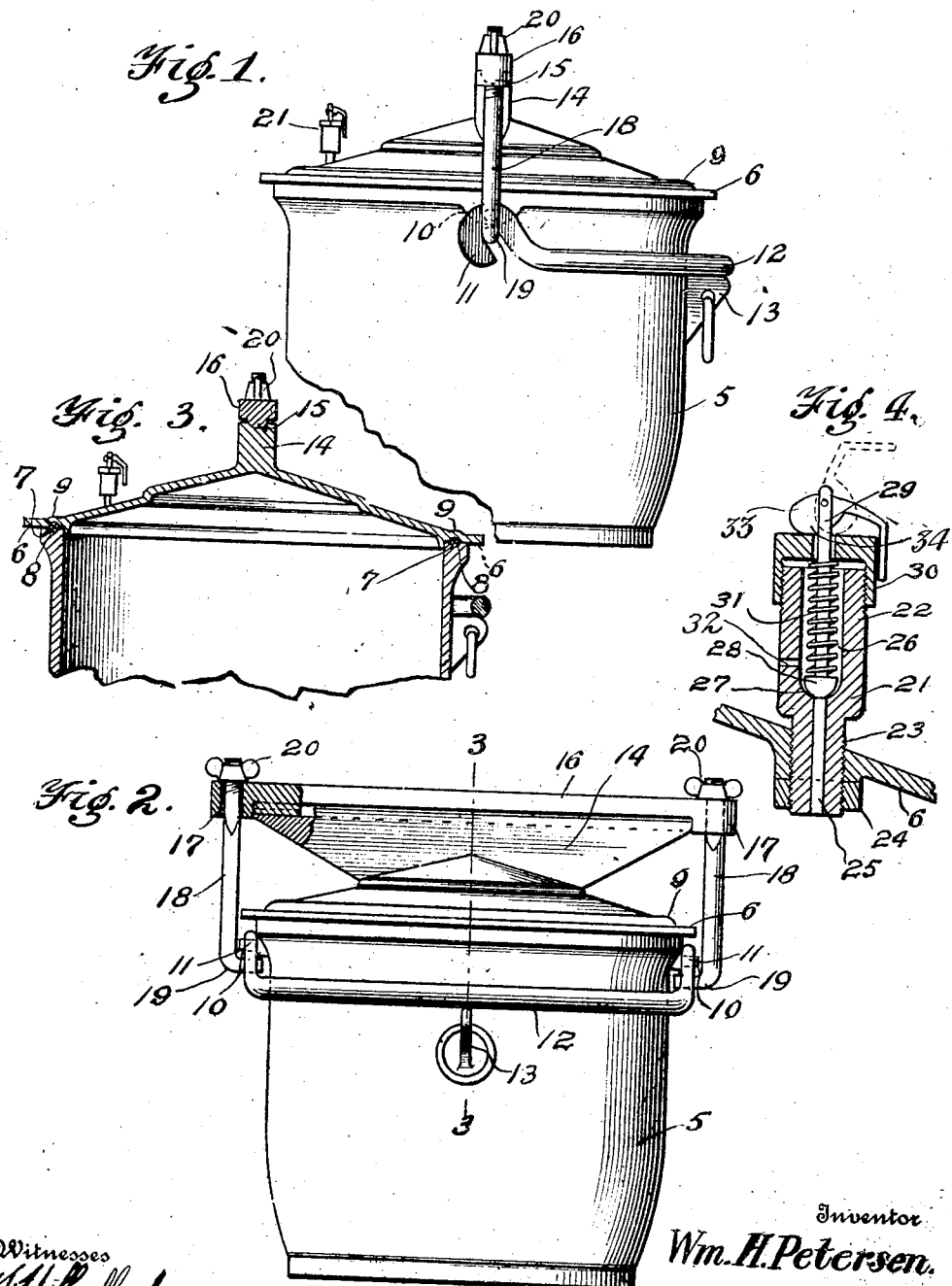

WILLIAM H. PETERSEN, OF LINCOLN, NEBRASKA.

COOKER.

1,189,173.

Specification of Letters Patent. Patented June 27, 1916.

Application filed May 5, 1915. Serial No. 26,107.

*To all whom it may concern:*

Be it known that I, WILLIAM H. PETERSEN, a citizen of the United States, residing at Lincoln, in the county of Lancaster and State of Nebraska, have invented new and useful Improvements in Cookers, of which the following is a specification.

This invention contemplates improvements in cooking vessels, and has for its object the provision of a device of this character constructed to confine the heat therein with a view of thoroughly cooking the food in a comparatively short order, under high pressure, with means for regulating the pressure to permit certain foods to cook slowly when desired.

Other objects will appear as the nature of the invention is better understood, the same consisting in the construction, combination and arrangement of parts hereinafter more fully described and particularly pointed out in the appended claim.

In the drawing forming part of this application like numerals of reference indicate similar parts in the several views and wherein:—

Figure 1 is a side view of the vessel constructed in accordance with my invention. Fig. 2 is an end view thereof. Fig. 3 is a sectional view taken on line 3—3 of Fig. 2. Fig. 4 is a detail sectional view of the pressure valve.

Referring more particularly to the drawing by numerals, 5 designates the body portion of the vessel which may be constructed of any suitable material and design, the cover therefor being indicated at 6. The upper edge of the vessel is provided with a groove 7 for the reception of the gasket 8, the outer edge of the cover being flared as at 9, the flared portion thereof being adapted to be seated upon said gasket to provide a fluid tight joint between the vessel and the cover when the latter is in operative position. Projecting from the opposite sides of the vessel at diametrically opposite points are the lugs 10 upon which the hook-like terminals 11 of the bail 12 are pivotally mounted, the latter being supported upon the rest 13 in normal horizontal position at one side of the body of the vessel.

Rising centrally from the cover 6 is a truss 14, disposed transversely with respect thereto and extending across the entire width of the cover, the upper edge of the truss being formed with a groove 15 for the reception of the bar 16, which has apertured ears 17 arranged at its opposite ends through which the rods 18 are extended, the latter terminating at their lower ends in hooks 19 eccentrically connected with the hook-like portions of the bail 12, while adjustably mounted on the upper ends of the rods 18 are tensioning nuts 20.

By reason of the construction and specific arrangement of parts hereinabove described it will be noted that the bail 12 serves in the capacity of a locking lever, operating to draw the cover downwardly into effective engagement with the body 5 and to retain the same in position thereon, when the bail is lowered, and to release said parts on movement of the bail in an upward direction. It is to be understood that the cover is only to be used when it is desired to use the vessel as a high pressure cooker, at which time the heat, and flavor extracted from the food is confined within the vessel, whereby the food is properly and thoroughly cooked in comparatively short order, with a minimum amount of fuel.

A safety pressure valve rising from the cover is indicated at 21 and comprises a cylindrical casing 22, having an exteriorly threaded reduced lower portion 23 threaded in a suitable opening in the cover 6 and secured therein by means of the nut 24 as shown. The casing is provided with a reduced bore 25 and an enlarged bore 26, forming a valve seat 27 therebetween, and within the latter is mounted a spring pressed valve 28, the stem 29 of which projects through the top of an adjusting nut 30 closing the upper end of the casing. The spring 31 encircles this stem and has one end bearing against the valve 28 and its opposite end against the nut 30, and operates to normally maintain the valve upon its seat. Obviously the tension of this spring can be easily regulated by means of the adjusting nut 30. When the pressure within the vessel reaches a predetermined height, the valve 28 is forced upwardly from its seat, thereby permitting escape of steam or the like through the vent 32 in the casing immediately above the seat 27. However with a view of regulating the pressure within the vessel to permit certain foods to be cooked slowly when desired, I employ an eccentric lever 33 pivoted to the stem 29 above the adjusting nut 30 and having its actuating portion 34 engaging the latter. By operating this lever it will be manifest that the valve may be held in opened position to permit escape of the steam or the like through the vent 32. This lever may be further operated to open the valve to permit escape of the steam or the like prior to draining the water from the vessel when the latter is used in the capacity of a high pressure cooker.

It is believed that from the foregoing description the nature and advantages of the invention will be readily apparent without requiring a more extended explanation and therefore the same has been omitted. However I desire to have it understood that various changes in the construction and arrangement of parts may be resorted to when desired as fall within the scope of the appended claim.

What is claimed is:—

In a cooking vessel, the combination with a swinging bail, of a cover therefor, a truss rising from said cover and having a longitudinal groove therein, a clamp bar arranged within the groove and having apertured ends projecting beyond the sides of the cover, and hook-like members passed through said apertures and adjustably associated with said bar, and eccentrically connected with said bail for the purpose described.

In testimony whereof I affix my signature in presence of two witnesses.

WILLIAM H. PETERSEN.

Witnesses:
E. P. HOLMES,
T. J. FARRELL.